Jan. 29, 1929.

C. C. HARRIS 1,700,312

DRIP FLANGE FOR WOOD ROLLS

Filed Aug. 14, 1926

Patented Jan. 29, 1929.

1,700,312

UNITED STATES PATENT OFFICE.

CARL C. HARRIS, OF ORANGE, MASSACHUSETTS, ASSIGNOR TO RODNEY HUNT MACHINE CO., OF ORANGE, MASSACHUSETTS, A CORPORATION OF MASSACHUSETTS.

DRIP FLANGE FOR WOOD ROLLS.

Application filed August 14, 1926. Serial No. 129,269.

This invention relates to a roll for use in textile and paper making machinery and the like in which the roll is subjected to the action of water or other liquids. The principal object of the invention is to provide a construction in which the water that runs over the edge of the roll will be directed away from the shaft or journals so that it cannot reach the shaft and thus creep out into the supporting bearings. The invention also involves the provision of this feature on a roll such as shown in my prior Patent No. 1,516,565, patented November 25, 1924.

Reference is to be had to the accompanying drawings in which

Figure 1:
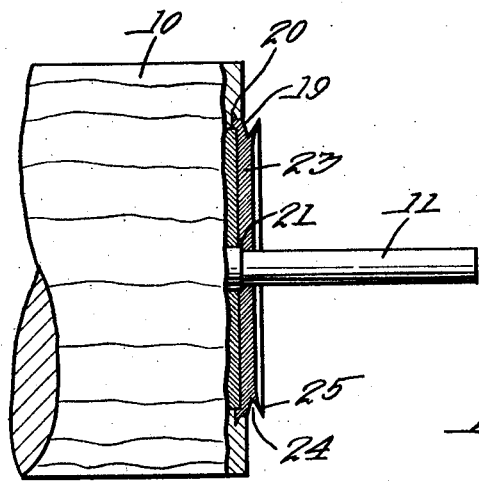
Figure 2:
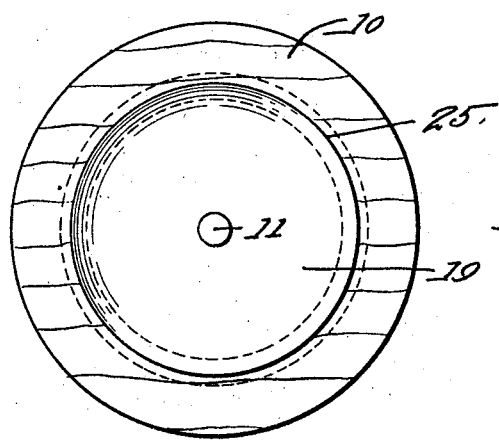

Fig. 1 is a side view of the end of a roll, partly in section, with a preferred embodiment of this invention applied thereto; and Fig. 2 is an end view of the same.

I have shown the invention as applied to a roll 10 such as illustrated in my above mentioned patent, said roll being made of wood ordinarily. In that patent I showed a soft metal seal cap 19 applied to the end of the roll around the shaft. It fits within the roll and on a shoulder on the shaft at 21 for the purpose of sealing the end of the roll and preventing the passage of water or moisture therethrough. This cap is made by casting a body of molten soft metal composition or alloy over the end face of the roll so as to cover the gudgeon completely and the end of the roll and lock the parts together. This is secured in position by the provision of a dove-tail 20 as described in said patent.

Now for the purpose of preventing water which splashes over the end of the roll from reaching the shaft or journal and then creeping out into the supporting bearing, I cast this plate 19 originally with a central projecting portion 23. After being cast, a groove 24 is cut all around the edge of this projection so as to provide a sharp flange 25 extending entirely around it. This flange is nearly flat and directs the water away in a plane transverse to the axis of the roll at a point near the roll but spaced therefrom.

When the roll is in operation, any water running over the edge of the roll enters the groove 24 and strikes the flange 25. It is directed downwardly so that it drops off at the lowest point. This prevents the water creeping in toward the center and eventually reaching the shaft 11 or journal. If the roll is rotated at a high speed the water would be discharged by centrifugal force.

This constitutes a very simple means for accomplishing this result and adds very little to the expense of manufacture as in this form it requires no extra piece or element. Of course, it is understood that one of these flanges will be provided at each end of the roll.

Although I have illustrated and described only one form of the invention I am aware of the fact that other modifications can be made therein by any person skilled in the art without departing from the scope of the invention as expressed in the claims. Therefore, I do not wish to be limited to all the details of construction herein shown and described, but what I do claim is:—

1. A roll for the purposes described having a metallic drip flange spaced from its end and having a sharp circular edge conical on the side toward the roll and flat on the outer side lying in a plane transverse to the axis of the roll.

2. The combination with a roll, of an end cap of cast soft metal fitting against the shaft or journal thereof entering an undercut recess in the roll, secured in the roll in the act of casting, and provided with an integral circular projection beyond the end of the roll, said projection having a groove therein all around the circumference to provide a circular drip flange beyond said groove for the purpose described.

In testimony whereof I have hereunto affixed my signature.

CARL C. HARRIS.